United States Patent Office 3,723,342
Patented Mar. 27, 1973

3,723,342
DEFOAMER COMPOSITION
Hugh J. S. Shane, John E. Schill, and John W. Lilley, Guelph, Ontario, Canada, assignors to Hart Chemical Limited, Guelph, Ontario, Canada
No Drawing. Filed Dec. 21, 1971, Ser. No. 210,544
Int. Cl. B01d 17/00
U.S. Cl. 252—358                                              20 Claims

ABSTRACT OF THE DISCLOSURE

A number of defoamer compositions based on a system containing an aliphatic diamide and a low viscosity mineral oil are described. Some of the compositions additionally contain spreading agents and a silicone oil and some contain a particular diamide. The compositions are useful in the control of foam in pulp mill operations.

---

This invention relates to defoamer compositions, more particularly for use in pulp mills.

In a number of locations in a pulp mill, undesirable foam is formed and usually it is desired to control such foam by the use of suitable additives. The present invention is concerned with compositions utilizable in such foam control processes.

There are a number of factors to be considered in the formulation of a suitable foam control material. A foam control material should have the ability to reduce an already-formed foam to a low level in a short period of time and, additionally, the ability to prevent the formation of foam from the liquor once the material is present, over an extended period of time.

In addition, the product should have ready pumpability to enable it to be transferred from a storage area to the required location. A long shelf life for the composition also is an important factor, that is, the composition should exhibit very little or no tendency to separate into its components on storing over an extended period of time.

In Canadian Pat. 508,856, there is disclosed a composition to inhibit the formation of foam in a dish washing machine detergent, the composition containing a diamide and a mineral oil. There is disclosed in copending application Ser. No. 210,540, filed Dec. 21, 1971, a process of treatment of aqueous pulp mill liquors using compositions of this type.

In accordance with the present invention, there are provided improved defoamer compositions having superior defoaming properties in pulp mills.

One such composition comprises an aliphatic diamide, a low viscosity mineral oil, a small quantity of a spreading agent and a small quantity of a silicone oil. The diamide is an amide derivative of a polymethylene diamine containing 2 to 6 methylene groups. The amide derivatives are formed with fatty acids and such fatty acids are long chain aliphatic carboxylic acids containing generally from 10 to 22 carbon atoms in the chain.

The acids may contain straight or branched chains, may have a degree of unsaturation, and may contain cycloaliphatic rings. It is not essential that the same acid form the amide group at each of the amine groups of the polymethylenediamine. It is within the scope of the invention to provide such mixed amides. Usually, however, the diamides used in the present invention are symmetrical.

Typical fatty acids are capric, lauric, myristic, palmitic, stearic, behenic, lauroleic, oleic, linoleic, linolenic, arachidic, palmitoleic, ricinoleic, petroselinic, vaccenic, oleostearic, licanic, gadoleic, arachidonic, cetoleic and erucic acids.

The quantity of diamide used in the composition depends on a number of factors, such as, the particular amide, the nature of the mineral oil, the quantity of modifying agents, i.e. the spreading agent and the silicone oil, and the type and nature of the mill effluent to be treated. Generally, however, from about 4 to about 12% by weight of the total composition of diamide is sufficient. The use of higher quantities in the composition generally leads to no greater defoaming power and gives rise to gelling, thus impairing the pumpability of the composition. These higher quantities of material therefore are avoided.

The lower limit of quantity of diamide is the minimum quantity thereof which produces a commercially satisfactory result in a particular environment.

The carrier for the diamide is a low viscosity mineral oil. A wide variety of mineral oils may be used and the choice of a particular oil depends on the particular diamide employed, as well as the nature of the liquid to be defoamed.

Mineral oils of a wide viscosity range may be employed, and, as indicated above, the choice of viscosity required depends on a number of factors. Generally, viscosities of above 100 S.U.S. at 210° F. are avoided, due to their heavy nature, while generally a mineral oil of viscosity from 25 to 100 S.U.S. at 210° F. is employed in this embodiment.

The spreading agent present in the composition of this first embodiment of the invention generally is used in quantities up to about 3% by weight of the composition. A large number of spreading agents are known, and typically the spreading agent may be one or more anionic, cationic or non-ionic surfactants. The particular type of spreading agent employed depends on the nature of the pulp mill liquor to be treated.

Examples of suitable anionic surfactants are fatty acids containing from about 12 to about 22 carbon atoms and soaps of the fatty acids. Examples of other suitable anionic surfactants are alkali metal salts of alkyl-aryl sulfonic acids, sulfated or sulfonated oils and alkali metal salts of short chain petroleum sulfonic acids.

Examples of suitable cationic surfactants are salts of long chain primary, secondary or tertiary amines, and quaternary salts.

Examples of suitable non-ionic surfactants are condensation products of higher fatty alcohols with ethylene oxide, condensation products of alkyl phenols with ethylene oxide, condensation products of fatty acid amides with ethylene oxide, polyethylene glycol esters of long chain fatty acids, ethylene oxide condensation products of polyhydric alcohol partial higher fatty acid esters and their inner anhydrides, long chain polyglycols in which one hydroxyl group is esterified with a higher fatty acid and the other hydroxyl group is etherified with a low molecular weight alcohol. Additional non-ionic surfactants include sorbitans, spans, Tweens, lecithin and ethoxylated lecithins.

The silicone oil may be present in the composition in amounts up to about 2% by weight of the composition. The silicone oil may have a viscosity in the range 25 to 60,000 centistokes and be an alkyl polysiloxane, such as a dimethyl polysiloxane.

In accordance with a specific instance of this first embodiment, the diamide is ethylene bis-distearamide. It has been found that compositions of this embodiment containing this particular diamide have outstanding effectiveness in defoaming operations. When this diamide is utilized, generally about 6 to 8% is employed and compositions containing about 7% of ethylene bis-distearamide have been found to be particularly effective in pulp mill applications.

The carrier mineral oil, as discussed above, may be one of a large number of low viscosity mineral oils of a viscosity from about 25 to 100 S.U.S. at 210° F., preferably containing a majority of paraffinic materials. A particular, effective mineral oil has been found to be Shellflex 210 which has a viscosity at 210° F. of 39.6 S.U.S. Other properties of Shellflex 210 are:

Viscosity S.U.S. at 100° F.: 104
Gravity, °API: 34.2
Gravity, specific: 0.8539
Aniline point, °F.: 279
Colour: L 0.5
Viscosity gravity constant: 0.805
Viscosity index: 97
Neutralization value, Tan C: 0.01
Pour point, °F.: —5
Flash point, °F.: 395
Carbon atom analysis, percent—
 Paraffins: 68.0
 Naphthenes: 27.6
 Aromatics: 4.4

It has been found that this particular oil provides an excellent dispersing and carrier medium for the diamide, especially for ethylene bis-distearamide.

A particularly preferred composition according to the present invention, therefore, comprises ethylene bis-distearamide, Shellflex 210, and small amounts each of a spreading agent and a silicone oil.

In this preferred composition, the spreading agent advantageously may be a calcium petroleum sulfonate, more particularly that sold under the name Surchem 306. When such calcium petroleum sulfonate is present, preferably it is used in quantities of about 0.5 to 1% of the composition.

A particularly preferred silicone oil is Antifoam A, which is a dimethyl polysiloxane containing from 4 to 4.5% of silica. When Antifoam A is employed, usually about 0.5% is employed.

A particularly preferred composition in accordance with this invention having outstanding versatility and utility in the control of foam, as well as having excellent shelf life and anti-gelling properties, is as follows:

7% ethylene bis-distearamide
0.5 to 1% Surchem 306
0.5% Antifoam A
Balance Shellflex 210

While this composition has excellent versatility in the treatment of pulp mill liquors, and indeed the compositions in accordance with this first embodiment have such versatility, for use with some pulp mill liquors, it may be desirable to incorporate into the composition modifying agents. Such modifying agents include alkaline earth metal short chain petroleum sulfonates, and esters of $\alpha,\beta$-unsaturated aliphatic acids such as acrylates. Where such modifying agents are employed, quantities of up to 5% by weight are added.

The petroleum sulfonate modifying agent may be the Surchem 306 preferably included as described above. For example, about 1% of Surchem 306 additionally may be included in the particularly preferred composition described above, and hence another particularly preferred composition of the present invention contains:

7% ethylene bis-distearamide
4% Surchem 306
0.5% Antifoam A
Balance Shellflex 210

The modifying agent may be an acrylate, such as Acryloid 953. Particularly preferred compositions of the invention contain about 2 and 3% of Acryloid 953. In accordance with the present invention, therefore, two further particularly preferred compositions, for use in the control of foam in pulp mills, are:

7% ethylene bis-distearamide
1% Surchem 306
0.5% Antifoam A
2% Acryloid 953
Balance Shellflex 210; and 7% ethylene bis-distearamide
1% Surchem 306
0.5% Antifoam A
3% Acryloid 953
Balance Shellflex 210.

It is possible, if desired, to incorporate into the composition two or more such modifiers.

In accordance with a further embodiment of the invention, a defoamer composition having particular utility in pulp mill applications is provided by the composition comprising ethylene bis-distearamide and a low viscosity mineral oil. This composition has been found to be superiorally effective in defoaming pulp mill liquors when compared to compositions containing other diamides formed from polymethylene diamines of 2 to 6 methylene groups and long chain aliphatic carboxylic acids containing from 10 to 22 carbon atoms in the chain, such as dioleyl ethylene diamide.

The quantity of ethylene bis-distearamide employed in this embodiment of the invention may vary as discussed above with reference to the first embodiment of the invention and generally quantities of from 4 to 12% by weight of the composition may be employed. Preferably quantities from 6 to 8%, particularly about 7% are used.

The mineral oil may be of the type discussed above with reference to the first embodiment, and, generally low viscosity mineral oils having a viscosity less than 100 S.U.S. at 210° F., usually from 25 to 500 S.U.S. at 210° F., are utilized. Preferably, the balance of the composition in accordance with this embodiment of the invention is constituted by Shellflex 210.

It is possible to incorporate into the compositions of this second embodiment one or more of the spreading agent, silicone oil and modifying agents discussed above with reference to the first embodiment.

The compositions of the present invention produce a surface effect on the aqueous liquid treated and this effect only is diminished when the composition emulsifies. The compositions of the present invention are used to control foam as the mineral oil dispersion and are not emulsified prior to use.

The amide present in the composition generally is uniformly dispersed throughout the mineral oil and the particles are of uniform size and distribution. Generally, the diamide has an average particle size of from 4 to 7 on the Hegman scale, preferably from 5 to 6.

The compositions of the present invention may be produced in any convenient manner, such as by mixing the ingredients, or heating the diamide above its melting point, incorporating the melt into the oil and then cooling. Preferably, the method described in copending application Ser. No. 210,547 filed Dec. 21, 1971, is utilized, since the compositions obtained thereby have excellent defoaming characteristics and additionally have long shelf life and good antigelling properties.

In those compositions where the modifying agents discussed above are included, the preferred method of formation of the composition is as disclosed in the above-mentioned application Ser. No. 210,547, namely, initial formation of a master batch of composition and then, following the ageing step, adding to the master batch the required modifiers.

The compositions of the present invention have particular applicability to the control of foaming in the brown stock washer of a kraft pulp mill. In the kraft process for the production of cellulosic fibrous pulp, wood chips or other cellulosic fibrous material is digested in a white liquor containing sodium sulphide and sodium hydroxide to dissolve from the wood chips a substantial part of the hemicelluloses, lignin and other extractable organic materials contained therein. The fibrous pulp so produced first is passed to a knotter wherein undigested wood is removed, then is separated from the resulting black liquor and washed in a brown stock washing operation.

In practice, a plurality of washing steps are carried out, generally about 3, with wash water passing countercurrently to the pulp in the operation. The spent wash water from the washing operation is passed with the black liquor to chemical recovery operations. The washed pulp then may be passed to a bleach plant.

Foaming occurs in this washing operation and is controlled by using compositions of this invention. The composition utilized preferably retains its effectiveness through each individual washing step of the brown stock washing operation. Many of the compositions of the present invention exhibit such substantivity.

The defoamer composition may be added at any convenient location. For example, the defoamer composition may be added to the pulp and black liquor mixture at the knotter. Alternatively, the composition may be sprayed or dripped onto the surface of the pulp in the washing operations.

There are other locations in pulp mills where foaming represents a problem in kraft pulp mills. For example, the black liquor is subjected to recovery operations to recover unused soda and sulfur values and an initial step in the recovery operation is evaporation. Considerable foaming may occur during the evaporation. The compositions of the present invention may be used to control such foaming.

The kraft pulp after washing is subjected to a series of operations in a bleach plant, including bleaching and caustic extraction. A number of washing operations also usually are carried out between such bleaching and caustic extracting steps and the compositions of the present invention are utilizable to control any foaming in such operations.

The compositions of the present invention also may be utilized to control foaming in other pulp screening and washing operations.

Further, it is possible to utilize compositions of the present invention to control foaming in sulfite mills.

Pulp mill liquors generally have an alkaline pH, although it is possible to use compositions of the present invention with liquor having a pH as low as 6. Usually, the pulp mill liquors treated with the compositions of the present invention have strongly alkaline pH's and black liquors typically have pH's from about 10 to 12.

The quantity of the compositions of the invention required to control foam varies depending on the nature of the pulp mill liquor to be treated and upon the individual composition. Generally, however, a quantity of defoamer of from 0.5 to 3 lbs. per ton of pulp may be employed, preferably about 1 to 2 lbs.

The invention is illustrated further by the following examples:

EXAMPLE 1

A batch of materials consisting of 7% ethylene bis-distearamide, 1% Surchem 306, 0.5% Antifoam A and the balance Shellflex 210 was charged to a kettle. The batch was cycled through a Microflow mill until the average particle size of the ethylene bis-distearamide was about 5 to 5½ on the Hegman scale, while the temperature of the mill effluent was maintained at about 35 to 45° C.

The composition after milling was transferred to a further kettle and the batch was heated to about 45° C. with agitation and the batch was maintained at approximately 45° C. with continued agitation for 6 hours. At the end of this time the temperature of the batch was raised to 60° C. for one hour and agitation was continued. Following heating at 60° C., the batch was rapidly cooled to room temperature.

The composition formed in the above manner was found to have excellent shelf life, as was observed by only a minor tendency of the composition to separate into its components over a long period of time. Also, the composition was found to have an outstanding resistance to gelling under in-mill conditions.

EXAMPLE 2

The procedure of Example 1 was repeated with the exception that the Antifoam A and Surchem 306 were omitted from the initial batch, so that the composition contains only 7% ethylene bis-distearamide and the balance Shellflex 210.

EXAMPLE 3

Modifications of the product of Example 1 were prepared by adding quantities of additional materials thereto:

| | Parts |
|---|---|
| (a) Product of Example 1 | 100 |
| Surchem 306 | 1 |
| (b) Product of Example 1 | 100 |
| Acryloid 953 | 2 |
| (c) Product of Example 1 | 97 |
| Acryloid 953 | 3 |

EXAMPLE 4

The process of Example 1 was repeated except that dioleyl ethylene diamide was substituted for the ethylene bisdistearamide and additionally the Surchem 306 and Antifoam A were omitted.

EXAMPLE 5

The defoaming properties of the compositions were measured. An experimental foam property testing apparatus was set up. The apparatus consisted of a 4½ gallon battery jar full of water immersed in which was a thermostatically controlled immersion heater, a thermometer, an agitator and a cylindrical glassware holding vessel for black liquor. For the evaluation of compositions, the black liquor was recycled through a small gear pump from the bottom back to the top of the holding vessel, reentering the vessel through a small spray nozzle. Certain standard parameters were chosen, including a recycle pump rate with nozzle of 2320 mls./min., and a standard black liquor charge of 500 ccs. at 180° F.

In making tests of defoaming characteristics of the compositions to be tested, the water bath was heated to about 180° F. and maintained at this temperature throughout. The 500 ccs. of black liquor to be treated, also heated to 180° F., were poured into the holding vessel and the recycle pump was started. As the black liquor recycled through the system, a head of foam quickly was formed in the holding vessel.

As soon as the foam height reached 3 inches, exactly 0.03 mls. of defoamer composition were syringed into the recycle stream. The effect of the addition on the foam was observed by taking foam height readings every 5 seconds for the first 35 seconds, every 10 seconds up to 60 seconds and then every 20 seconds.

The results obtained using products of Examples 1, 2 and 4 in this testing procedure are reproduced in the table below, together with the results for a comparative product (c) formed from a simple amide, myristoyl amide, omitting the Surchem 306 and Antifoam A.

TABLE

| Time (seconds) | Foam height (inches) | | | | |
|---|---|---|---|---|---|
| | None | C. | Ex. 1 | Ex. 2 | Ex. 4 |
| 0 | 3 | 3 | 3 | 3 | 3 |
| 5 | 4.75 | 4 | 0.5 | 2.6 | 2.6 |
| 10 | 6.5 | 4.75 | 0.6 | 2.6 | 2.5 |
| 15 | 7.25 | 5.4 | 0.75 | 2.5 | 2.4 |
| 20 | | 6 | 1 | 2.6 | 2.4 |
| 25 | | 6.6 | 1.1 | 2.6 | 2.5 |
| 30 | | 7.3 | 1.1 | 2.6 | 2.6 |
| 35 | | | 1.5 | 2.6 | 3 |
| 40 | | | 1.6 | 2.6 | 3.2 |
| 50 | | | 1.8 | 2.5 | 4 |
| 60 | | | 2.25 | 2.4 | 5 |
| 80 | | | 3.5 | 2.6 | 6.3 |
| 100 | | | 4.75 | 2.6 | 7.2 |
| 120 | | | 6.25 | 3 | |
| 140 | | | | 3.2 | |
| 160 | | | | 4 | |
| 180 | | | | 4.6 | |
| 200 | | | | 5.4 | |
| 220 | | | | 7 | |

The results in this table show a number of comparisons. Thus, compositions formed from diamides, i.e., the products of Examples 1, 2 and 4, all to some degree have the ability to reduce the level of an already-formed foam, and the ability to control the formation of foam from a black liquor, whereas a composition containing a simple amide does not exhibit the ability to reduce the level of an already-formed foam and produces only a very marginal improvement in the level of foam formation from the black liquor as compared to the absence of any additive.

It also is seen from this table, that compositions formed from ethylene bis-distearamide have superior overall defoaming properties as compared to other diamides, such as dioleyl ethylene diamide, as may be seen by a comparison of the results obtained from the products of Examples 2 and 4. While both compositions have the ability to reduce the level of foam to approximately the same extent, the composition containing the ethylene bis-distearamide (Example 2) has a superior ability to inhibit the formation of foam from the black liquor.

Additionally, these results indicate the superiority of defoaming properties of diamide and low viscosity mineral oil compositions containing a spreading agent and a silicone oil, as compared to compositions omitting these materials, particularly compositions where the diamide is ethylene bisdistearamide. The composition of Example 1 exhibits the ability to lower markedly the level of already-formed foam in comparison to the results for the products of Examples 2 and 4. The composition also possesses the ability to inhibit the formation of foam over an extended period of time.

Modifications are possible within the scope of the invention.

What we claim is:

1. A defoamer composition comprising from 4 to 12% of an aliphatic diamide, said diamide being that formed from a polymethylene diamine containing from 2 to 6 carbon atoms and at least one long chain aliphatic carboxylic acid containing from 12 to 22 carbon atoms, a small quantity of an anionic, cationic or non-ionic surfactant, a small quantity of a silicone oil and a low viscosity mineral oil, said diamide having an average particle size from 4 to 7 on the Hegman scale and being dispersed substantially uniformly throughout said oil.

2. The composition of claim 1 wherein said diamide has an average particle size of from 5 to 6 on the Hegman scale.

3. The composition of claim 1 wherein said diamide is ethylene bis-distearamide.

4. The composition of claim 3 wherein said diamide is present in an amount of from about 6 to 8% of the composition.

5. The composition of claim 3 wherein said diamide is present in an amount of about 7% of the composition.

6. The composition of claim 1 wherein there is present up to about 3% of said spreading agent.

7. The composition of claim 6 wherein said spreading agent is present in an amount of about ½ to 1%.

8. The composition of claim 1 wherein said spreading agent is a calcium petroleum sulfonate.

9. The composition of claim 1 wherein there is present up to about 2% of said silicone oil.

10. The composition of claim 1 wherein said silicone oil is a dimethyl siloxane oil.

11. The composition of claim 1 wherein said mineral oil has a viscosity of from 25 to 100 S.U.S. at 210° F.

12. The composition of claim 1 wherein there is additionally present up to about 3% of a long chain alkaline earth metal sulfonate.

13. The composition of claim 1 wherein there is additionally present up to about 5% of an ester of an $\alpha,\beta$-ethylenically unsaturated aliphatic acid.

14. A defoamer composition consisting of:
7% of ethylene bis-bistearamide,
1% of a calcium petroleum sulfonate,
0.5% of a dimethylsiloxane oil, and
the balance of a mineral oil, having a viscosity of about 40 S.U.S. at 210° F.;
said amide having an average particle size from 5 to 6 on the Hegman scale and being substantially uniformly dispersed throughout said oil.

15. A defoamer composition consisting of:
7% of ethylene bis-distearamide,
4% of a calcium petroleum sulfonate,
0.5 of a dimethylsiloxane oil, and
the balance of a mineral oil, having a viscosity of about 40 S.U.S. at 210° F.;
said amide having an average particle size from 5 to 6 on the Hegman scale and being substantially uniformly dispersed throughout said oil.

16. A defoamer composition consisting of:
7% of ethylene bis-distearamide,
1% of a calcium petroleum sulfonate,
0.5% of a dimethylsiloxane oil,
2 to 3% of an acrylate ester, and
the balance of a mineral oil, having a viscosity of about 40 S.U.S. at 210° F.;
said amide having an average particle size from 5 to 6 on the Hegman scale and being substantially uniformly dispersed throughout said oil.

17. A defoamer composition consisting of:
4 to 12% of ethylene bis-distearamide, and
the balance of a low viscosity mineral oil,
said amide having an average particle size from 4 to 7 on the Hegman scale and being substantially uniformly dispersed throughout said oil.

18. The composition of claim 17 wherein said amide is present in an amount of from 6 to 8% of the composition.

19. The composition of claim 17 wherein said amide is present in an amount of about 7%.

20. The composition of claim 17 wherein said oil has a viscosity of from about 25 to about 100 S.U.S. at 210° F.

References Cited
UNITED STATES PATENTS
1,892,857  1/1933  Spellmeyer _____ 252—321

JOHN D. WELSH, Primary Examiner

U.S. Cl. X.R.
252—321